US008566001B2

(12) United States Patent
Stuttaford et al.

(10) Patent No.: US 8,566,001 B2
(45) Date of Patent: Oct. 22, 2013

(54) SELECTING AND APPLYING TO FUEL-FLOW SPLITS BIAS VALUES TO CORRECT FOR ELEVATED INLET AIR HUMIDITY

(75) Inventors: Peter Stuttaford, Jupiter, FL (US); Nicolas Demougeot, Jupiter, FL (US); Melvin Swann, Jupiter, FL (US)

(73) Assignee: Alstom Technology Ltd., Baden (CH)

( * ) Notice: Subject to any disclaimer, the term of this patent is extended or adjusted under 35 U.S.C. 154(b) by 267 days.

(21) Appl. No.: 13/087,048

(22) Filed: Apr. 14, 2011

(65) Prior Publication Data
US 2011/0270503 A1 Nov. 3, 2011

Related U.S. Application Data

(60) Provisional application No. 61/329,458, filed on Apr. 29, 2010.

(51) Int. Cl.
*F02C 3/00* (2006.01)
*G06F 19/00* (2011.01)

(52) U.S. Cl.
USPC ............................................. 701/100; 60/39.3

(58) Field of Classification Search
USPC ................. 701/100; 60/775, 39.3; 73/961.04; 415/1, 47
See application file for complete search history.

(56) References Cited

U.S. PATENT DOCUMENTS

| 5,353,585 | A | * | 10/1994 | Munk | 60/775 |
| 5,632,148 | A | * | 5/1997 | Bronicki et al. | 60/728 |
| 5,790,972 | A | * | 8/1998 | Kohlenberger | 701/103 |
| 6,718,771 | B1 | | 4/2004 | Kopko | |
| 2002/0106001 | A1 | * | 8/2002 | Tomlinson et al. | 374/144 |
| 2003/0196439 | A1 | * | 10/2003 | Utamura | 60/775 |
| 2003/0217554 | A1 | * | 11/2003 | Gadde et al. | 60/776 |
| 2004/0255596 | A1 | * | 12/2004 | Horii et al. | 60/775 |
| 2008/0243352 | A1 | | 10/2008 | Healy | |

FOREIGN PATENT DOCUMENTS

| EP | 0509496 | 10/1992 |
| EP | 1231369 | 8/2002 |

OTHER PUBLICATIONS

International Search Report and Written Opinion for PCT/US2011/033227 of Sep. 22, 2011.
Mark G. Lawrence: "The Relationship between Relative Humidity and the Dewpoint Temperagure in Moist Air: A Simple Conversion and Applications", Bulletin of the American Meteorological Society, vol. 86, No. 2, Feb. 1, 2005, 101 pages.

\* cited by examiner

*Primary Examiner* — Tan Q Nguyen
(74) *Attorney, Agent, or Firm* — Shook, Hardy & Bacon L.L.P.

(57) ABSTRACT

Methods for controlling a gas turbine engine are provided, where a compressor inlet temperature, ambient temperature, and relative humidity are measured. Utilizing these measurements, it is first determined whether an evaporation cooler is actively importing water content into inlet air entering the compressor. This determination is based on whether the inlet air is substantially cooler than the ambient temperature. If so, an EC correction factor is added to an inlet air temperature value (CTIM) and set as an air temperature parameter (INLETIM). Second, it is determined whether the relative humidity is greater than a predefined threshold. If so, a relative humidity (RH) correction factor is added to CTIM and set as the INLETIM. Next, the INLETIM and TTRF are located in a look-up table, and a bias value corresponding to these inputs is identified. The fuel-flow for a fuel circuit is adjusted according to the identified bias value.

19 Claims, 3 Drawing Sheets

405↘

PM1 INLETIM BIAS     415↘     INLETIM (DEG. F)    425↙

| TTRF (DEG. F) | -20 | 10 | 30 | 50 | 70 | 90 |
|---|---|---|---|---|---|---|
| 410↘ 2200 | 1.50 | 1.25 | 1.00 | 0.75 | 0.00 | 0.00 |
| 2250 | 1.50 | 1.25 | 1.00 | 0.5 | 0.00 | 0.00 |
| 2300 | 1.00 | 0.75 | 0.50 | 0.0 | 0.00 | 0.00 |
| 2350 | 1.00 | 0.75 | 0.50 | 0.25 | 0.00 | 0.00 |
| 2400 | 1.75 | 1.50 | 1.25 | 0.50 | 0.00 | 0.25 |
| 2425 | 2.00 | 1.75 | 1.50 | 0.50 | 0.00 | 0.25 |
| 2450 | 2.00 | 1.75 | 1.50 | 0.50 | 0.00 | 0.25 |

⏟ 420

PM3 INLETIM BIAS     INLETIM (DEG. F)

| TTRF (DEG. F) | -20 | 10 | 30 | 50 | 70 | 90 |
|---|---|---|---|---|---|---|
| 2200 | 0.00 | 0.00 | 0.00 | 0.00 | 0.00 | 0.50 |
| 2250 | 0.00 | 0.00 | 0.00 | 0.00 | 0.00 | 0.50 |
| 2300 | 0.00 | 0.00 | 0.00 | 0.00 | 0.00 | 0.50 |
| 2350 | 0.00 | 0.00 | 0.00 | 0.00 | 0.00 | 1.00 |
| 2400 | -1.50 | -1.50 | -1.25 | -1.00 | 0.00 | 2.00 |
| 2425 | -1.25 | -1.00 | -0.75 | -0.50 | 0.00 | 2.50 |
| 2450 | -1.25 | -1.00 | -0.75 | -0.50 | 0.00 | 2.50 |

QUAT INLET BIAS     INLETIM (DEG. F)

| TTRF (DEG. F) | -20 | 10 | 30 | 50 | 70 | 90 |
|---|---|---|---|---|---|---|
| 2200 | 0.00 | 0.00 | 0.00 | 0.00 | 0.00 | 0.00 |
| 2250 | 0.00 | 0.00 | 0.00 | 0.00 | 0.00 | 0.00 |
| 2300 | -1.00 | -0.75 | -0.75 | -0.75 | 0.00 | 0.00 |
| 2350 | -1.00 | -1.00 | -1.00 | -0.50 | 0.00 | 0.00 |
| 2400 | 0.00 | 0.00 | 0.00 | 0.00 | 0.00 | 0.00 |
| 2425 | 0.00 | 0.00 | 0.00 | 0.00 | 0.00 | 0.00 |
| 2450 | 0.00 | 0.00 | 0.00 | 0.00 | 0.00 | 0.00 |

*FIG. 4.*

SELECTING AND APPLYING TO FUEL-FLOW SPLITS BIAS VALUES TO CORRECT FOR ELEVATED INLET AIR HUMIDITY

CROSS REFERENCE TO RELATED APPLICATIONS

This Nonprovisional Patent Application claims the benefit of U.S. Provisional Application No. 61/329,458, filed Apr. 29, 2010, entitled "Selecting and Applying to Fuel-flow Splits Bias Values to Correct for Elevated Inlet Air Humidity," the teachings of which are hereby incorporated by reference in their entirety.

TECHNICAL FIELD

The present invention relates to gas turbine engines. More particularly, embodiments of the present invention relate to an apparatus and method for maintaining combustion dynamics and emissions by accounting for variations in the humidity of air entering a gas turbine engine.

BACKGROUND OF THE INVENTION

Gas turbine engines operate to produce mechanical work or thrust. Land-based gas turbine engines typically have a generator coupled thereto for the purposes of generating electricity. There are a number of issues that affect the overall performance and durability of the engine components, especially the combustion section. The combustion process creates varying pressure oscillations and dynamics in the combustion hardware that can result in significant wear. Specifically, the pressure oscillations can cause mating hardware to vibrate and move relative to one another. Excessive combustion dynamics can cause premature wear of mating hardware such that the hardware must be repaired or replaced.

Typically, gas turbine engines comprise multiple fuel circuits, depending on the quantity and location of the fuel nozzles as well as the combustor operating conditions. For example, a General Electric Frame 7FA gas turbine engine that utilizes a dry-low NOx (DLN) 2.6 combustor, has six main fuel nozzles per combustor and additional fuel injectors located radially about the combustor case, known as quaternary nozzles. A different quantity of these fuel nozzles operate together as the engine increases and decreases in power in an effort to minimize oxides of nitrogen (NOx) emissions and combustion dynamics in the combustor. For this engine design, there are four different fuel circuits associated with the different nozzles, PM1, PM2, PM3, and quaternary, with each circuit requiring a specific fuel flow rate depending on the operating conditions. This division of the fuel within the fuel circuits to a comply with a particular required fuel flow rate is referred to herein as a "fuel-flow split."

As such, employing a method to adjust, or bias, fuel-flow splits based upon changes in the density of the air entering the combustor, where unchecked air-humidity fluctuations typically adversely affect combustion dynamics, would improve the reliability and emissions performance of the gas turbine engine.

SUMMARY

The invention is defined by the claims below, not by this Summary, which is provided to introduce a selection of concepts in a simplified form that are further described below in the Detailed Description. Embodiments of the present invention are directed towards a system and method for, among other things, maintaining combustion dynamics and emissions in a gas turbine engine upon detecting variations in the humidity of the air entering a combustor.

The present invention provides embodiments for controlling a gas turbine engine to maintain combustion dynamics and emissions. In one embodiment of the present invention, a method is provided for controlling the gas turbine engine by, initially, determining whether an evaporation cooler is actively importing water content into the air entering an inlet of a compressor. This determination is based on a condition of whether the air entering the compressor is cooler, by a predetermined threshold, than the ambient air temperature. If the condition is met, an evaporation cooler (EC) correction factor is combined with an inlet air temperature value (CTIM) and the combination is set as an air temperature parameter (INLETIM). As such, the EC correction factor accounts for the lower density of the inlet air caused by the water content imported by the evaporation cooler.

In another embodiment of the present invention, a method is provided for controlling the gas turbine engine by, initially, determining whether the relative humidity is greater than a predefined threshold (e.g., average humidity of a dry day at 60%). This determination is based on a condition of whether the air entering the compressor is more humid, by a particular elevation in water content, than reference air humidity. If the condition is met, a relative humidity (RH) correction factor is combined with the inlet air temperature value (CTIM) and the combination is set as the INLETIM. As such, the RH correction factor accounts for the elevated water content of the inlet air caused by a weather system or humidity captured within a building housing the gas turbine engine.

Next, the INLETIM and TTRF are located in the look-up table for a given fuel circuit, or interpolated from values in the look-up table, and a bias value that is a function of the INLETIM and TTRF is identified. The fuel flow for the fuel circuit is adjusted according to the identified bias value. As such, the bias value can adjust the performance of the gas turbine engine such that combustion dynamic and emissions are maintained, while the baseline fuel schedule for a given fuel circuit is held constant. By determining and controlling the fuel flow to the fuel circuits as a function of the compressor inlet temperature, the ambient temperature, and the relative humidity, unit reliability and hardware durability are increased while the emissions and the necessary maintenance are reduced.

Additional advantages and features of the present invention will be set forth in part in a description which follows, and in part will become apparent to those skilled in the art upon examination of the following, or may be learned from practice of the invention.

BRIEF DESCRIPTION OF THE SEVERAL VIEWS OF THE DRAWING

The present invention is described in detail below with reference to the attached drawing figures, wherein:

FIG. 4 depicts a fuel schedule look-up table in accordance with the method depicted in FIG. 3.

DETAILED DESCRIPTION

Figure 1:
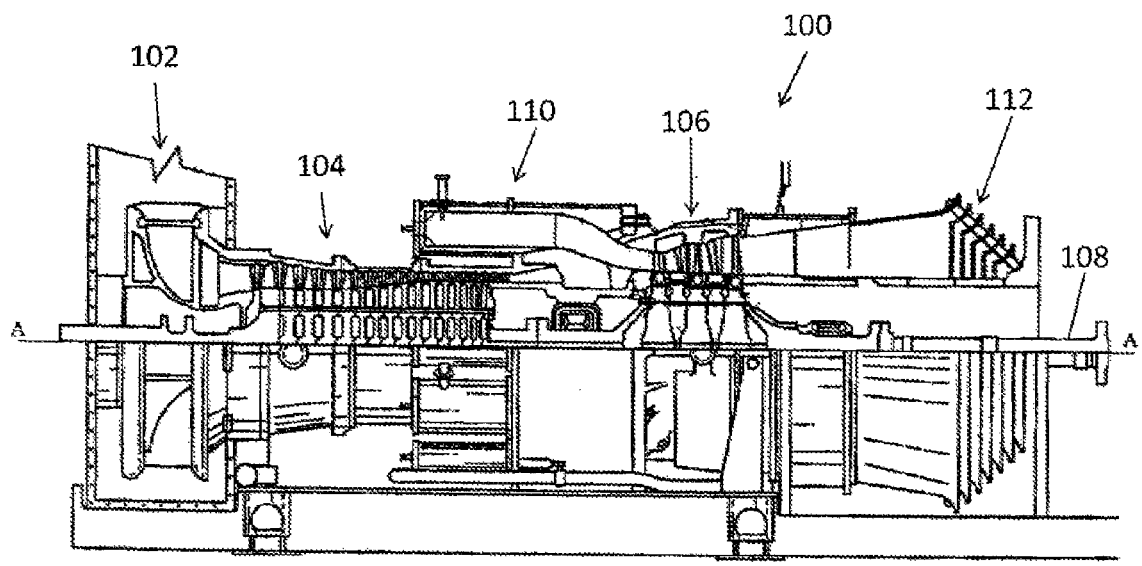
FIG. 1 depicts a cross section view of a gas turbine engine.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Generally, embodiments of the present invention may be embodied as, among other things, a method, a system, or a computer-program product for selecting a bias value based on a humidity level of the air entering an inlet of a combustor and adjusting a fuel-flow split based on the bias value. Accordingly, the embodiments may take the form of a hardware embodiment, a software embodiment, or an embodiment combining software and hardware. In one instance, embodiments of the present invention take the form of the computer-program product that includes computer-useable instructions embodied on one or more computer-readable media.

Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Generally, changes in ambient conditions alter the combustion dynamics and emissions of gas turbine engines. These combustion dynamics are altered in a non-linear fashion as the ambient conditions (e.g., air temperature and air humidity) vary. As such, unchecked changes in ambient conditions may cause the combustion dynamics to be altered to an extent that the performance and reliability of the gas turbine engine is severely degraded.

Stated another way, an optimum fuel schedule, or operating curve used by the gas turbine engine to govern performance, should not be static, but should dynamically amend itself based on changes to the ambient conditions. However, dynamically amending the fuel schedule generates substantial performance issues upon returning to default conditions. Accordingly, introducing a process to select and apply bias values to the fuel schedule, thereby affecting fuel-flow splits without permanently altering the fuel schedule, would be an enhancement. As such, this process for selecting and applying bias values is discussed below.

Figure 2:
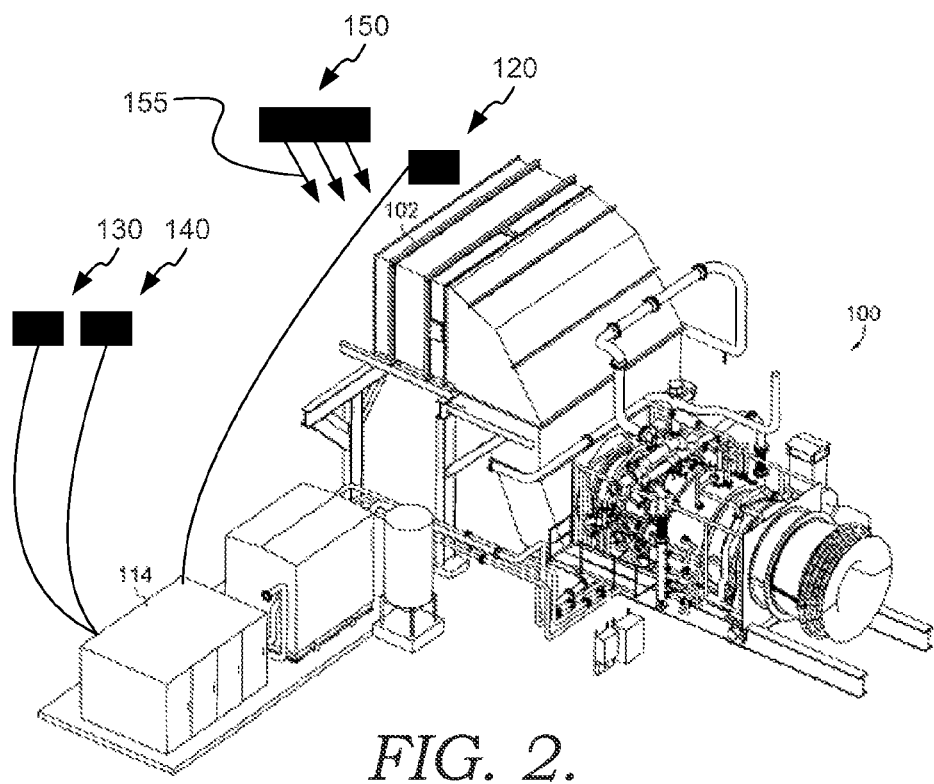
FIG. 2 depicts a perspective view of a gas turbine engine.

Referring initially to FIGS. 1 and 2, a gas turbine engine 100 for which the present invention is utilized is shown. The gas turbine engine 100 comprises an inlet 102, a compressor 104 that is coupled to a turbine 106 along a shaft 108 coaxial with axis A-A. At least one combustor 110 is in fluid communication with the compressor 104 and mixes fuel with the air from the compressor 104 and ignites this mixture so as to create hot combustion gases at an elevated pressure. The hot combustion gases from the at least one combustor 110 pass through the turbine 106, whereby work is extracted from the gases as the turbine 106 rotates and mechanically drives the compressor 104 through the shaft 108, and possibly also an electrical generator (not shown). The gases then pass to the exhaust 112.

A control system 114, which comprises hardware and software components, is a device that is utilized to direct the function of the gas turbine engine 100 based on a variety of inputs. An example of the control system 114 is a Mark V controller produced by General Electric Company. The control system 114 has individual valves that govern the total amount of fuel and fuel distribution (or fuel split). The total amount of fuel is based on either a speed control set point, power output set point, or exhaust temperature relationship. The fuel distribution is based on the engine operating mode and a predetermined schedule. The control system 114 described above can schedule fuel for a variety of fuel circuits (e.g., four different fuel circuits).

The exemplary control system 114 includes at least one auto-tune controller (not shown) that resembles a computing device for controlling aspects of the gas turbine engine 100. The auto-tune controller may include a data store (e.g., for holding a look-up table with a set of bias values) and a processing unit that supports the execution of the auto-tune controller and the media stored thereon. Generally, the processing unit is embodied as some form of a computing unit (e.g., central processing unit, microprocessor, etc.) to support operations of software components running thereon. As utilized herein, the phrase "processing unit" generally refers to a dedicated computing device with processing power and storage memory, which supports operating software that underlies the execution of software, applications, and computer programs thereon. In one instance, the processing unit is configured with tangible hardware elements, or machines, that are integral, or operably coupled, to a computer. In another instance, the processing unit may encompass a processor (not shown) coupled to the computer-readable medium (discussed above). Generally, the computer-readable medium stores, at least temporarily, a plurality of computer software components that are executable by a processor. As utilized herein, the term "processor" is not meant to be limiting and may encompass any elements of the processing unit that act in a computational capacity. In such capacity, the processor may be configured as a tangible article that processes instructions. In an exemplary embodiment, processing may involve fetching, decoding/interpreting, executing, and writing back instructions.

Turning now to FIG. 2, the control system 114 may be operably coupled (wired or wireless) to one or more sensors. In one embodiment, one or more of the sensors may be configured as temperature sensor(s), as depicted by reference numeral 120, that are placed in proximity with, or within, the inlet 102 of the compressor 104. As such, the temperature sensor(s) 120 are designed to measure the temperature of the air entering the inlet 102 of the compressor 104, occasionally referred to herein as "compressor temperature inlet median" (CTIM). In another embodiment, one or more of the sensors may be configured as temperature sensor(s), as depicted by reference numeral 140, that are placed at a location removed from the gas turbine engine 100 such that heat produced by the gas turbine engine 100 will not influence their temperature measurement. As such, the temperature sensor(s) 140 are designed to measure ambient temperature, occasionally referred to herein as "Tambient."

In operation, circumstances may occur that cause the CTIM to deviate from the ambient temperature. In particular, the CTIM may differ from the ambient temperature based on a treatment applied to the air entering the compressor 104, such as a cooling affect caused by inlet foggers or an evaporation cooler 150. For instance, the evaporation cooler 150 may be located in proximity with, or within, the inlet 102 of the compressor 104. In this location, the evaporation cooler 150 may be configured to generate a mist 155 that pushes water into the inlet 102 of the compressor 104. This increased humidity at the inlet 102 cools the inlet air temperature, while decreasing the air density. If unchecked, this decreased density will adversely affect the performance of the gas turbine engine 100. Accordingly, as more fully explained below, measuring the CTIM via the temperature sensor(s) 120 and the ambient temperature via the temperature sensors 140, and comparing the two, is critical in determining whether the evaporation cooler 150 is actively injecting the mist 155 into the air entering the inlet 104 and in determining how to compensate for the resultant decrease in air density.

Further, one or more of the sensors may include instrumentation to measure the humidity (e.g., specific or relative), as depicted by reference numeral 130. In instances where no treatment is being applied to the air entering the inlet 102 of the compressor 104 (e.g., the evaporation cooler 150 is inactive), the humidity measured by the instrumentation 130 substantially matches the humidity level of the air entering the inlet 102. Otherwise, calculations performed by the control system 114 (incorporating inputs from the temperature sensors 120 and 140 and the instrumentation 130) can be used to adjust for any increased humidity in the air entering the inlet 102, as discussed below.

In embodiments, the temperature sensor 140 and the instrumentation 130 may be pre-established as a power plant instrumentation package that can be connected as an input to the control system 114. In other embodiments, the temperature sensors 120 and 140, and the instrumentation 130, may be installed and configured upon updating the gas turbine engine 100 with software to operate the method steps below. With respect to the integration of the software to perform the process described herein, the software may be implemented as a component of the logic that governs the operation of the gas turbine engine 100, and/or the software may be added as a subroutine in the logic of an auto-tuning process.

Figure 3:
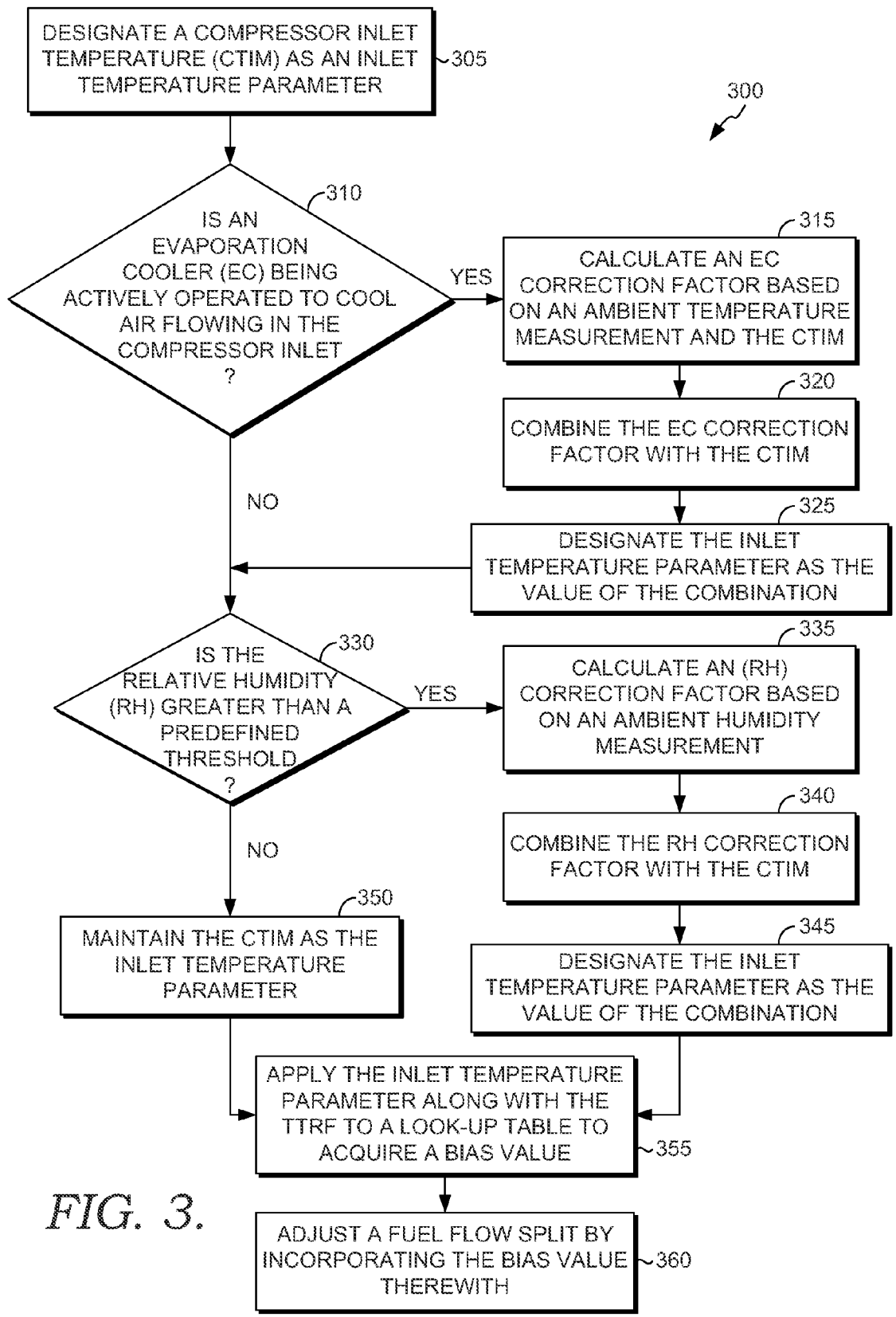
FIG. 3 depicts a way of controlling the fuel flow for a gas turbine engine in accordance with an embodiment of the present invention.

A method of controlling the gas turbine engine 100 is shown in FIG. 3. The embodiment disclosed in FIG. 3 depicts a way of controlling a gas turbine engine having a compressor, at least one combustor, a turbine, and a control system, in which the control system utilizes a look-up table of data in order to more efficiently schedule the fuel flow for a fuel circuit. Initially, the method 300 comprises a step of measuring a compressor inlet temperature, or CTIM (not shown). The temperature is typically measured with one or more thermocouples (e.g., utilizing the temperature sensor 120 of FIG. 2) located near the bellmouth of the compressor inlet (e.g., the inlet 102 of the compressor 104 of FIG. 2). The CTIM is then stored in the memory of a controller, which may comprise a processing unit accommodated by the control system 114 of FIG. 2. Next, the controller calculates a turbine reference temperature (TTRF). As one skilled in the art will understand, the TTRF is calculated in real-time, as the gas turbine engine operates, and is based on several measured parameters as well as various constants. For example, the TTRF is a function of compressor discharge pressure, exhaust pressure, and the change in pressure, or pressure drop, across the combustion system as well as other conditions. This calculation also varies depending on the engine site in order to account for geographic and climactic variables.

With continued reference to FIG. 3, in step 305, the value of the CTIM that is stored in the memory of the controller is designated as an inlet temperature parameter, referred to herein as "INLETIM." As discussed more fully below, the INLETIM in conjunction with the TTRF are used to target a bias value within one or more look-up tables, where the bias value is used to adjust a fuel-flow split of one or more fuel circuits (e.g., PM1, PM2, PM3, and quaternary).

As indicated at step 310, a determination of whether an evaporation cooler (e.g., evaporation cooler 150 of FIG. 2) is being used to cool air flowing into the inlet of the compressor is preformed. In an exemplary embodiment this determination is performed by ascertaining whether the CTIM (e.g., air temperature at the inlet 102 measured by the temperature sensor 120 of FIG. 2) is a threshold number of degrees cooler than the ambient temperature (Tambient) (e.g., ambient air temperature measured by the temperature sensor 140). In a specific instance, the determination at step 310 is accomplished by ascertaining whether the following exemplary condition is satisfied.

$$\text{IF } (CTIM+5) < Tambient$$

In this specific instance, the threshold number of degrees below ambient temperature is 5 degrees Fahrenheit. However, it should be understood and appreciated that any number of degrees may be used to in this exemplary condition to determine whether the evaporation cooler is actively operating.

If the condition is satisfied, the method 300 proceeds to step 315, where an evaporation cooler (EC) correction factor is calculated. Typically, the EC correction factor is based, in part, on the difference between the Tambient and the CTIM. This difference, or delta value, may be manipulated by a coefficient k1. As such, in a specific instance, the EC correction factor is calculated via the following equation.

$$k1 \times (Tambient - CTIM)$$

In embodiments, the coefficient k1 may be set to the value of 1.5 to amplify the influence of the delta value on the INLETIM. However, the value of the k1 may be statically set at other numbers, or may be a user-defined adjustable constant.

Upon determining that the evaporation cooler is actively operating and upon calculating the EC correction factor, the CTIM is combined with the EC correction factor, as indicated at step 320. Then, the combination of the CTIM and the EC correction factor is designated as the inlet temperature parameter (INLETIM), as indicated at step 325. In a specific instance, an exemplary equation that encapsulates the steps 320 and 325 is provided below.

$$INLETIM = CTIM + k1 \times (Tambient - CTIM) \quad \text{(Equation A)}$$

Accordingly, by setting the combination of the CTIM value and the EC correction factor to the INLETIM, the INLETIM is properly adjusted to account for inlet air that has additional humidity (higher water content than the reference humidity reading) and is less dense, as the water vapor with a lighter molecular weight than air replaces the air molecules in a given volume. Further, the INLETIM is properly adjusted to account for inlet air that has a cooler temperature than the ambient temperature. Because instrumentation to measure humidity is generally placed in a location removed from the inlet of the compressor, the calculations above are critical to determine whether the evaporation cooler is actively operating, and if so, how to compensate for the amount of water being imported into the air entering the inlet.

Returning to the decision presented in step 310 of the method 300, if the condition of whether the evaporation cooler is active is not satisfied, the method 300 proceeds to step 330. As indicated at step 330, a determination of whether relative humidity is greater than a predefined threshold is performed. In operation, the predefined threshold is based on a discrepancy between the expected water content of the inlet air, based on a measure air temperature at the compressor inlet, and the actual water content, based on the measured relative humidity. In an exemplary embodiment, this determination is made by first ascertaining whether the difference between the ambient air temperature (e.g., measured by the temperature sensor 140 of FIG. 2) and the variable dew-point temperature (Tdew) is greater than or equal to zero, but less than twelve. In a specific instance, the computation of Tdew is performed by the following exemplary equation.

$$Tdew = Tambient - \frac{(100 - RelativeHumidity)}{2.778}$$

As discussed above, the variable Tambient represents the ambient air temperature, while the variable RelativeHumidity represents the relative humidity (e.g., measured by the instrumentation 130 of FIG. 2). Accordingly, the procedure of first ascertaining whether the difference between the ambient air temperature and the variable dew-point temperature is greater than or equal to zero, but less than twelve, is carried out by solving the following exemplary equation.

0≤(Tambient−Tdew)<12

Next, the determination at step 330 is accomplished by secondly ascertaining whether the variable Tambient is greater than Tdew. Accordingly, the procedure of secondly ascertaining whether the variable Tambient is greater than Tdew is carried out by solving the following exemplary equation.

Tambient>Tdew

If both these first and second conditions are met, the decision at step 330 is deemed satisfied. In other words, the relative humidity is presently being measured at such a level that compensating for a decrease in air density caused by the elevated humidity is determined to be necessary. Upon satisfying the decision at step 330, a relative humidity (RH) correction factor is calculated, as indicated at step 335. The RH correction factor is based on the presumption that the relative humidity presently being measured is greater than the average humidity, typically 60%, used to set the baseline fuel schedule. As such, the RH correction factor utilizes a ratio of (a) the difference between the relative humidity presently being measured (RelativeHumidity) and the average humidity, and (b) the difference between 100% humidity and the average humidity. This ratio is amplified by a coefficient k2 that is user-defined and adjustable. In one embodiment, the coefficient k2 is set at a value of 16. In a specific instance, the computation of the RH correction factor (Twetparam) is performed by the following exemplary equation.

$$Twetparam = \frac{k2(RelativeHumidity - 60\%)}{(100\% - 60\%)}$$

Upon calculating the RH correction factor, it is combined with the CTIM value and the combination is designated as the inlet temperature parameter (INLETIM), as indicated by steps 340 and 345. In a specific instance, the correction of the INLETIM using the RH correction factor (Twetparam) is performed by the following exemplary equation.

INLETIM=CTIM+Twetparam          (Equation B)

It should be noted that, typically, the maximum INLETIM between Equation B (shown immediately above) and Equation A (discussed previously) is used.

Accordingly, by setting the combination of the CTIM value and the RH correction factor to the INLETIM, the INLETIM is properly adjusted to account for inlet air that has increased humidity and is less dense. That is, INLETIM is dynamically corrected as a function of relative humidity to compensate for a decreased inlet air density that, if left unchecked, adversely affects the performance (e.g., combustor dynamics and emissions) of a gas turbine engine. In operation, the steps 330, 335, 340, and 345 attempt to maintain consistency of the combustor dynamics and emissions of a gas turbine engine upon the weather changing from a dry sunny day to a rainy humid day and whether evaporative cooling is in use. This meteorological event would typically cause the gas turbine engine to possibly vary dramatically in performance.

Returning to the method 300 of FIG. 3, if the conditions referenced above are not satisfied (i.e., the evaporation cooler is not active and the relative humidity indicates relatively dry air), then the CTIM remains designated as the value of the inlet temperature parameter (INLETIM). Conversely, if all the conditions referenced above are satisfied (i.e., the evaporation cooler is actively operating and the relative humidity indicates saturated air), then both the EC correlation factor and the RH correlation factor are combined with the CTIM, and the combination is designated as the value of the inlet temperature parameter (INLETIM). However, this latter situation is considered rare, because in instances where the inlet air is already very humid the evaporation cooler, which serves to increase inlet air humidity, will not be active as it will not provide an enhancement to performance.

Upon designating the value of the inlet temperature parameter (INLETIM), the TTRF in conjunction with the INLETIM are applied to a look-up table in order to identify a bias value, as indicated in step 355. The manner in which step 355 is carried out is described in detail below with reference to FIG. 4. The identified bias value may then be employed to adjust a fuel-flow split of the fuel circuit that corresponds with the look-up table, as indicated at step 360.

Referring now to FIG. 4, a selection of look-up tables, which relate to specific baseline fuel schedules for particular fuel circuits (PM1, PM3 and Quaternary), in accordance with the method 300 depicted in FIG. 3, are shown. The general format of the look-up tables will be discussed with reference to the look-up table 405 corresponding to the PM1 fuel circuit. The look-up table 405 provides a selection of values 415 of the inlet temperature parameter (INLETIM) along a horizontal header and provides a selection of values 410 of the TTRF in a right-side column.

In the body of the look-up table 405, a set of bias values 420 are provided. These bias values generally increase in size (either positive or negative) the farther removed they are from an expected inlet temperature parameter (INLETIM), which was likely used to set the baseline fuel schedule for a given fuel circuit. For instance, with respect to the look-up table 405, at an INLETIM value of 70, the bias values are zero presumably because this is the ambient range in which the baseline fuel schedule for the PM1 fuel circuit was established.

In embodiments, the set of bias values 420 are defined upon executing a tuning process on the gas turbine engine. In one instance, tuning is carried out by manually adjusting the fuel-flow splits while the gas turbine is operating. This type of tuning is carried out upon initially setting up the gas turbine engine. In another instance, the look-up table 405 is automatically populated by the controller when an issue occurs during the regular operation of the gar turbine engine.

In an exemplary practice, once the INLETIM value is designated, upon implementing the method 300 of FIG. 3, a specific bias value is identified from the look-up table 405. Because the bias values 420 are a function of the INLETIM and the TTRF, these values are input into the look-up table 405 to target the specific bias value that appropriately compensates for an elevated humidity condition.

In performing the process of identifying the specific bias value, depicted as reference numeral 425, an initial determination is made as to whether or not the TTRF and INLETIM have a bias value of a fuel-flow split listed in the look-up table. As one skilled in the art will understand, the fuel-flow split is a commonly referred to term for the percentage of the available fuel flow that is directed to a specific fuel circuit of a combustor. The look-up table 405, as can be seen from FIG. 4, lists bias values 420 for specific TTRF's and INLETIM's. Given the number of variables, rarely will a TTRF and INLETIM correspond exactly to bias values 420 listed in the look-up table 405. When this occurs, it is necessary to interpolate between the bias values 420 listed in the look-up table 405.

If the INLETIM and TTRF do not correspond to bias values 420 listed in the look-up table 405, then it is necessary to interpolate the specific bias value 425 for the PM1 fuel circuit from two INLETIM's and two TTRF's listed in the look-up table 405 that preferably bracket the measured INLETIM and calculated TTRF. Referring back to FIG. 4, for the PM1 fuel circuit, if the measured INLETIM is 40 and the TTRF is 2275 degrees Fahrenheit, it can be seen that neither of these values are listed in the look-up table 405, and therefore, each must be interpolated. As such, for the example of the measured INLETIM at 40 and the TTRF of 2275 degrees Fahrenheit, the interpolated bias value 425 would be 0.5 as calculated by $(((1+0.5)/2+(0.5+0)/2)/2)$. Next, the fuel-flow split of the PM1 fuel circuit is adjusted by the interpolated bias value 425.

Once the fuel-flow split has been adjusted for one of the fuel circuits, a determination is made as to whether or not additional fuel-flow splits of other fuel circuits are to be manipulated. Depending on the mode of operation of the combustor, there may or may not be other fuel circuits operating at the same time. If the other fuel-flow splits of other fuel circuits are to be manipulated, then the process described above reiterates.

In the event that either the measured INLETIM or the TTRF results in a value outside of the values listed in the tables, then either the maximum or minimum value listed is used for the interpolation process.

It is important to note that the process defined above is one in which the measured and calculated variables can be used to determine the fuel splits. It is possible that the setting of the fuel splits could be determined in slightly different manner that is still within the scope of the present invention.

As previously discussed with respect to FIG. 2 and the embodiments disclosed herein, the steps through which the fuel splits are adjusted with the bias values are programmed into the memory of the controller as computer-readable instructions. These computer readable instructions consult look-up tables, baseline fuel schedules, and fuel-flow splits to determine or calculate the proper adjustments for given compressor inlet conditions and ambient measurements at a particular instance. The controller then activates various valves to each of the fuel circuits so as to open and/or close and monitor their positions and fuel-flow splits affected thereby by way of instrumentation so as to maintain the fuel flow at a desired rate.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and within the scope of the claims.

What is claimed is:

1. A method for controlling a gas turbine engine having a compressor, at least one combustor, a turbine, and a control system, the method comprising:
   providing an evaporation cooler for treating air entering the compressor;
   providing a first temperature sensor designed to measure a temperature of the air entering an inlet of the compressor;
   providing a second temperature sensor designed to measure ambient air temperature;
   determining whether the evaporation cooler is actively importing water content into the air entering the inlet of the compressor via a process comprising:
      (a) receiving the compressor-inlet air temperature from the first temperature sensor;
      (b) receiving the ambient air temperature from the second temperature sensor; and
      (c) comparing the compressor-inlet air temperature to the ambient air temperature;
   when a value of the ambient air temperature overcomes a value of the compressor-inlet air temperature by a predetermined threshold, recognizing that the evaporation cooler is actively importing water content into the inlet air; and
   when the evaporation cooler is recognized as actively importing water content into the inlet air, invoking an evaporation-cooler correction process that adjusts a fuel-flow split, the evaporation cooler correction process comprising:
      deriving an evaporation cooler (EC) correction factor as a function of a difference between the ambient air temperature and the compressor-inlet air temperature;

performing a calculation that combines the EC correction factor and the compressor-inlet air temperature; and designating a resultant value of the combination as an inlet temperature parameter.

2. The method of claim 1, wherein the second temperature sensor is placed at a location removed from the gas turbine engine such that heat generated by the gas turbine engine is non-influential upon the measured ambient air temperature.

3. The method of claim 1, wherein the fuel-flow split instructs the control system how to govern distribution of fuel within one or more fuel circuits of the at least one combustor.

4. The method of claim 1, further comprising generating a turbine reference temperature as a function of at least one of discharge pressure of the compressor, exhaust pressure of the gas turbine engine, or a pressure drop over time across a combustion system.

5. The method of claim 4, further comprising:
accessing a look-up table that lists a set of bias values, wherein each of the bias values is associated with at least one inlet temperature parameter and at least one turbine reference temperature; and
querying the look-up table with the inlet temperature parameter and the turbine reference temperature to target a corresponding bias value from the set of bias values.

6. The method of claim 5, wherein adjusting the fuel-flow split comprises manipulating fuel-flow split according to the targeted bias value.

7. A method for controlling a gas turbine engine having a compressor, at least one combustor, a turbine, and a control system, the method comprising:
providing a temperature sensor designed to measure ambient air temperature entering an inlet of the combustor;
instrumentation to measure relative humidity of the air proximate to the gas turbine engine;
determining whether the relative humidity is substantially greater than an expected humidity via a process comprising:
  (a) receiving the ambient air temperature from the temperature sensor;
  (b) receiving the relative humidity from the instrumentation;
  (c) calculating a dew-point temperature by taking a difference of the ambient air temperature and a ratio of the relative humidity over a constant; and
  (d) comparing the ambient air temperature to the dew-point temperature;
when the ambient air temperature is greater than the dew-point temperature, identifying that a current density level of the air at the inlet of the combustor is diminished below an expected density level; and
when the air density is identified as diminished, invoking an elevated-humidity correction process that adjusts a fuel-flow split.

8. The method of claim 7, wherein the elevated-humidity correction process comprises:
accessing a predetermined value of average humidity; and
calculating a relative humidity (RH) correction factor by solving a ratio of a difference between the relative humidity and the average humidity over the difference between 100% humidity and the average humidity.

9. The method of claim 8, wherein the elevated-humidity correction process further comprises:
combining the RH correction factor and the ambient air temperature; and designating a resultant value of the combination as an inlet temperature parameter.

10. The method of claim 9, further comprising generating a turbine reference temperature as a function of at least one of discharge pressure of the compressor, exhaust pressure of the gas turbine engine, or a pressure drop over time across a combustion system.

11. The method of claim 10, further comprising:
accessing a look-up table that lists a set of bias values, wherein each of the bias values is associated with at least one inlet temperature parameter and at least one turbine reference temperature; and
querying the look-up table with the inlet temperature parameter and the turbine reference temperature to target a corresponding bias value from the set of bias values.

12. The method of claim 11, wherein adjusting the fuel-flow split comprises manipulating fuel-flow split according to the targeted bias value.

13. The method of claim 12, further comprising generating the set of bias values listed within the look-up table by manually or automatically tuning the fuel-flow split while the gas turbine engine is operating.

14. The method of claim 7, wherein the fuel-flow split instructs the control system how to govern distribution of fuel within one or more fuel circuits of the at least one combustor.

15. The method of claim 14, wherein the expected density level is used to set a baseline fuel schedule for the one or more fuel circuits.

16. One or more computer-readable media that is executable by a controller to perform method of accounting for a current humidity level of air entering an inlet of a compressor that is higher than an expected level of humidity programmed into a baseline fuel schedule of a gas turbine engine, the baseline fuel schedule including one or more fuel flow splits, the method comprising:
determining whether an evaporation cooler is actively importing water content into the air entering the inlet of the compressor by comparing compressor-inlet air temperature against ambient air temperature;
when a value of the ambient air temperature overcomes a value of the compressor-inlet air temperature by a predetermined threshold, recognizing that the evaporation cooler is actively importing water content into the inlet air;
when the evaporation cooler is recognized as actively importing water content into the inlet air, invoking an evaporation-cooler correction process that adjusts a fuel-flow split;
when the evaporation cooler is not recognized as actively importing water content into the inlet air, determining whether a relative humidity is substantially greater than an expected humidity;
when the ambient air temperature is greater than the dew-point temperature, identifying that a current density level of the air at the inlet of the combustor is diminished below an expected density level; and
when the air density is identified as diminished, invoking an elevated-humidity correction process that adjusts a fuel-flow split.

17. The media of claim 16, wherein determining whether a relative humidity is substantially greater than an expected humidity comprises:
calculating a dew-point temperature by taking a difference of the ambient air temperature and a ratio of a relative humidity at the inlet of the compressor over a constant; and comparing the ambient air temperature to the dew-point temperature.

18. The media of claim 16, when the evaporation cooler is recognized as actively importing water content into the inlet air, employing a look-up table to identify a bias value for correcting the baseline fuel schedule of the gas turbine engine.

19. The media of claim 16, when the air density is identified as diminished, employing a look-up table to identify a bias value for correcting the baseline fuel schedule of the gas turbine engine.

* * * * *